(12) United States Patent
Foo

(10) Patent No.: US 7,923,498 B2
(45) Date of Patent: Apr. 12, 2011

(54) ELASTOMERIC FILMS AND GLOVES

(75) Inventor: Khon Pu Foo, Petaling Jaya (MY)

(73) Assignee: Diptech Pte. Limited, Singapore (SG)

( * ) Notice: Subject to any disclaimer, the term of this patent is extended or adjusted under 35 U.S.C. 154(b) by 262 days.

(21) Appl. No.: 12/010,141

(22) Filed: Jan. 22, 2008

(65) Prior Publication Data

US 2008/0139723 A1    Jun. 12, 2008

Related U.S. Application Data

(63) Continuation-in-part of application No. PCT/SG2005/000358, filed on Oct. 18, 2005.

(30) Foreign Application Priority Data

Jul. 20, 2005    (MY) ............................... PI 20053343

(51) Int. Cl.
*C08K 3/30* (2006.01)
*C08F 8/00* (2006.01)
*B05D 3/02* (2006.01)
*B05D 1/18* (2006.01)

(52) U.S. Cl. ..... 524/418; 524/560; 525/368; 427/385.5; 427/407.1; 427/430.1

(58) Field of Classification Search .................. 524/418, 524/560; 525/368; 427/385.5, 407.1, 430.1
See application file for complete search history.

(56) References Cited

U.S. PATENT DOCUMENTS

| | | | |
|---|---|---|---|
| 4,696,065 A * | 9/1987 | Elenteny | 2/168 |
| 4,826,721 A | 5/1989 | Obrecht et al. | |
| 2004/0010067 A1 * | 1/2004 | Ota et al. | 524/432 |
| 2004/0071909 A1 | 4/2004 | McGlothlin et al. | |

FOREIGN PATENT DOCUMENTS

| | | |
|---|---|---|
| EP | 1 266 927 | 12/2002 |
| EP | 1 361 247 | 11/2003 |
| EP | 1 435 374 | 7/2004 |

OTHER PUBLICATIONS

Stigi et al. "Guidance for Medical Gloves: A Workshop Manual." U.S. Department of Health and Human Services. Revised Sep. 1996.
International Search Report dated Jun. 9, 2006.
Office Action mailed May 21, 2010 from Chinese Patent Office in corresponding CN application No. 200580051615.6 (English translation attached).

\* cited by examiner

*Primary Examiner* — Michael M Bernshteyn
(74) *Attorney, Agent, or Firm* — Jacobson Holman PLLC

(57) ABSTRACT

There is disclosed a composition for producing an elastomeric film comprising: a synthetic polymer, sulphur, and a metal-oxide cross-linking agent. The concentration of the total solids in the composition is between 5-20% by weight of the composition. Also disclosed is a multiple-coating method of manufacturing an elastomeric film comprising the steps of:
  (i) providing a composition comprising
     a synthetic polymer,
     a cross linking agent,
     wherein the concentration of the total solids in the composition is between 5-20% by weight of the composition,
  (ii) contacting the composition with a mould to form a layer of composition on the mould,
  (iii) contacting the layer of composition on the mould with a further amount of the composition to form a further layer,
  (iv) drying the composition, and
  (v) curing the composition.

12 Claims, No Drawings

ELASTOMERIC FILMS AND GLOVES

This is a continuation-in-part of PCT/SG05/000358 filed Oct. 18, 2005 and published in English.

FIELD

The present invention relates to compositions for producing elastomeric films for use in manufacturing synthetic gloves, and methods for forming elastomeric films and gloves.

BACKGROUND

Elastomeric articles such as gloves are generally known to be manufactured from natural rubber. The common process of manufacture involves dipping a shaped mould into a tank containing natural rubber latex. However, rubber latex is not an ideal material for forming gloves as rubber latex causes skin allergic reactions due to small quantities of proteins which leach from the glove into the skin.

Alternatives to natural rubber have been developed which utilise synthetic polymeric materials. The manufacture of elastomeric articles from synthetic polymeric materials usually involves a similar method of dipping a mould into a bath containing a synthetic polymer, to deposit a layer on the mould corresponding to the desired thickness of the glove.

This single dipping process can produce elastomeric films with a high probability of having or developing defects, such as a weak spot, or pin hole. This can cause problems as it exposes the wearer to infection, or chemical permeation, depending on the application. Multiple dipping processes produce films with multiple layers and can avoid or limit the risk of defects such as these, but they are generally thicker, and therefore low in sensitivity. If the wearer is working with small instruments, such as in surgical applications, this low sensitivity will cause problems.

There is a need to develop an elastomeric film suitable for making synthetic gloves wherein the wearer has good sensitivity, to enable the wearer to work comfortably with small instruments, but also strong enough not to have, or develop, defects.

The manufacture of elastomeric articles from synthetic polymeric materials also usually involves the use of an accelerator, which can potentially cause chemical allergies. The commercially used accelerators are derived from carbamates, thiurams or thiazoles and are categorised as type IV allergens. These can cause allergic contact dermatitis with symptoms including erythema, vesicles, papules, pruritus, blisters and/or crusting. There is a need to address the problem of chemical allergies caused by the use of such allergens in the manufacture of elastomeric articles.

SUMMARY

The present invention provides compositions for producing elastomeric films, synthetic gloves made from these elastomeric films, and methods of manufacturing said gloves.

In a first aspect the present invention provides a composition for producing an elastomeric film comprising:
 a synthetic polymer,
 sulphur, and
 a metal oxide cross-linking agent,
wherein the concentration of the total solids in the composition (TSC %) is between 5-20% by weight of the composition, and wherein said composition excludes accelerator(s).

The composition is suitably a dispersion of the synthetic polymer, generally a linear polymer, in a liquid, usually water. The metal oxide cross-linking agent works by ionically cross-linking groups in the synthetic polymer. For example, when the synthetic polymer is carboxylated polyacrylonitrile butadiene, the metal oxide cross-linker, such as zinc oxide, works by ionically cross-linking the carboxylic acid groups. The sulphur acts to covalently cross-link the unsaturated butadiene.

Generally, the amount of cross-linking determines the elasticity of the elastomer in the elastomeric film. Therefore, the amount of metal oxide cross-linking agent and sulphur will contribute to the extent of cross-linking and the elasticity of the final elastomeric film. This is important as a synthetic glove usually requires good elongation properties to facilitate stretching of the glove to fit on the wearer's hand.

The elastomeric film is suitable for use in manufacturing synthetic gloves. Accordingly, in a further aspect, the present invention provides synthetic gloves made from multi-layer elastomeric film comprising:
 a cured composition of
 a synthetic polymer,
 sulphur, and
 a metal oxide cross linking agent, wherein the
 composition excludes accelerator(s), and
wherein the average thickness of the multi-layer elastomeric film is between about 0.01 to about 0.3 mm.

In one embodiment of the invention, the average thickness of the elastomeric film is between about 0.03 to about 0.08 mm.

In a further aspect, the present invention provides a multiple-coating method of manufacturing a layered elastomeric film comprising the steps of:
 (i) dipping a mould into a coagulant containing calcium ions at a concentration of between 1% and 10% by weight, followed by
 (ii) drying or partially drying the coagulant-dipped mould,
 (iii) dipping the coagulant-coated mould into a composition for producing an elastomeric film having a total solids content of between 5% and 20% and a temperature of between 25° C. and 45° C. for a dwell time of between 1.0 and 10.0 seconds to produce a layer of elastomeric film composition on the mould,
 (iv) drying the elastomeric film composition,
 (v) dipping the mould into a composition for producing an elastomeric film having a total solids content of between 5% and 20% and a temperature of between 25° C. and 45° C. for a dwell time of between 1.0 and 10.0 seconds to produce a further layer of elastomeric film composition on the mould,
 (vi) optionally repeating the drying step (iv) and the further dipping step (v), and
 (vii) drying and curing the layered elastomeric film, wherein the average thickness of each layer is between 6% and 90%, and the average thickness of the total layered elastomeric film is between about 0.01 mm and about 0.3 mm.

The composition used may be of any type. The composition suitably comprises a synthetic elastomeric polymer or copolymer, such as one containing free tonically cross-linkable groups and covalently cross-linkable groups. The composition may further comprise a cross-linking agent, which may be a metal oxide or a non-metal oxide, and may additionally comprise sulphur and/or accelerators.

The multiple coating method defined above can utilise a composition having sulphur. Metal oxide cross linking agents or non-metal oxide cross linking agents such as sulfenamides compounds, thiazoles compounds, guanidines compounds, thiurams compounds, dithiocarbamates compounds, dithiophosphates compounds, aldehyde-mine compounds, sulfenimide compounds, sulfur/sulfur donor, phenolic curatives, benzoquinone derivatives, bismaleimides, triazine accelerators, urethane crosslinkers, peroxides derivatives may be used.

More than one layer can be added to the first layer, i.e., steps (iv) and (v) can be repeated several times. The final elastomeric film can comprise 2 to 15 layers, preferably 2 to 10 layers, more preferably 2 to 6 layers of composition. Each layer can be of approximately equal thickness, or of differing thickness. For example the $1^{st}$ layer can be 50%, 2nd layer 30%, 3rd layer 15% and so on. Approximately equal thickness can be achieved by varying the total solids content of the composition of each layer and the temperature at which the layer is deposited. Different mechanisms of deposition can occur for each layer and different thicknesses can be deposited even if the % TSC is maintained at the same level. Accordingly, varying the % TSC is sometimes required to maintain the same level of thickness. The thickness of the deposited layers can also vary according to the concentration of Calcium ions in the coagulant solution.

The multiple coating method described above results in a stronger film which assists in reducing the potential for defects such as pin holes and/or weak spots. The unusually low concentration of solids utilised in the composition to manufacture the elastomeric film assists in keeping each coating layer thin. Accordingly, overall thickness is kept to a minimum and this also assists in keeping costs low in terms of the amount of formulation utilised to make each glove.

DETAILED DESCRIPTION

The elastomeric film of the present invention is suitable for manufacturing synthetic gloves, such as synthetic disposable gloves. Conventionally, synthetic disposable gloves are used to avoid contamination, i.e. in food handling or in hospitals where there is a risk of transfer of infection on contact with sites of infection. Synthetic disposable gloves are also used to avoid the transfer of disease via skin contact between patient and examiner, when physical examination is carried out.

Disposable gloves are usually thinner than non-disposable gloves, where the reduced cost of manufacture of a thinner glove means it is cost-effective to dispose of the glove after a single or several uses.

The physical properties of gloves, including synthetic disposable gloves, usually include a snug tight fit of a thin elastomeric film to facilitate sensitivity to touch by the wearer. At the same time, sufficient elongation is required to ensure the glove can be stretched to facilitate insertion of the wearer's hand into the glove with relative ease and without damage to the glove.

Composition

The composition for producing an elastomeric film for use in the manufacture of synthetic gloves comprises a synthetic polymer, sulphur, and a metal-oxide cross-linking agent the concentration of total solids in the composition being between 5 and 20% by weight of the composition. The percentage of total solids content (TSC %) can vary. The solids are preferably diluted with water to said concentration.

Synthetic Polymer

The principal synthetic polymer may be a single polymer or combination of 2 or more polymers. Examples of suitable polymers are carboxylated polyacrylonitrile butadiene, polyisoprene, polychloroprene, and/or polyurethane. Any other elastic polymer/copolymer which may be envisaged as possessing suitable characteristics for the manufacture of a synthetic glove, as described earlier, can be utilised in this invention.

The synthetic polymer is preferably a polymer containing free ionically cross-linkable groups and covalently cross-linkable groups. An example of an ionically cross-linkable group is carboxylate, and an example of a covalently cross-linkable group is a double bond, as in isoprene or butadiene. Preferably, the synthetic polymer is carboxylated polyacrylonitrile butadiene. This is commonly provided as a mixture of carboxylated nitrile latex and nitrile butadiene rubber.

The amount of synthetic polymer present is calculated as being 100 phr. The amounts of the remaining components of the composition are calculated relative to the amount of synthetic polymer present.

Metal Oxide Cross-Linking Agent

The metal oxide cross-linking agent may be a single compound or a combination of compounds. One suitable class of metal oxide cross-linking agent is a divalent metal oxide cross-linking agent. Suitable examples of this divalent class of metal oxide cross-linking agents are lead oxide, magnesium oxide, barium oxide and/or zinc oxide.

In a preferred embodiment the synthetic polymer is carboxylated polyacrylonitrile butadiene and the metal oxide cross-linking agent is zinc oxide. In this embodiment, the carboxylic acid groups are ionically cross linked by the zinc oxide cross linking agent.

The amount of metal oxide cross-linker present is preferably in the range 0.2-2.0 phr, further preferably 0.5-1.5 phr, even further preferably 0.8-1.6 phr, more preferably 0.8-1.2 phr. The amount of metal oxide is particularly important if there are no other accelerators present in the composition.

Sulphur

The sulphur is present in the composition as a covalent cross-linker of any unsaturated groups in the synthetic polymer. As mentioned earlier, in the example of the synthetic polymer being carboxylated butadiene nitrile, the sulphur acts to covalently cross-link the unsaturated butadiene.

The sulphur can be present in the form of elemental sulphur. The sulphur can also be donated by organic sulphuric compounds, for example TMTD (Tetramethylthiuram Disulfide). However, sulphur donors such as this one are likely to contribute to chemical allergies and it is preferred to keep their use to a minimum in the manufacture of gloves when allergic content is an issue.

The amount of sulphur utilized in the composition is suitably between 0.01 and 0.5 phr, preferably between 0.05 and 0.3 phr, further preferably 0.1 phr.

Preparation of the Composition

The composition can be prepared by mixing the synthetic polymer with the metal oxide cross-linker, sulphur, and any other usual additives.

The usual additives can include stabilisers, antioxidants, vulcanising agents, colourising agents, etc. The preparation of the composition includes steps known in the art, and the composition can be prepared in a conventional manner. For example, the synthetic polymer can be diluted with a stabilizer solution, such as potassium hydroxide and/or sodium hydroxide. The amount of stabiliser used is dependent on the synthetic polymer employed, the pH of the composition and other factors. The stabiliser can range from 0.5 to 2 phr, preferably 1.0 to 1.5 phr, which is diluted with water, preferably filtered water.

The diluted stabilizer solution is added to the synthetic polymer. The pH of the mixture is preferably adjusted to between 8.5 to 10.5, further preferably between 9.0 to 10.0.

The metal oxide cross-linker can then be added to the mixture followed by the addition of sulphur.

Antioxidants, for example Wingstal L(the product of p-cresol and dicyclopentadiene) may be added in amounts ranging from 0.2-0.6 phr, preferably 0.3-0.5 phr. Pigments such as titanium dioxide, selected for its pigmentation, to reduce the transparency of the final elastomeric film, may be added in amounts ranging from 1.0-2.5 phr, preferably 1.5-2.0 phr and colourants can also be added in the desired amounts. The mixture is then diluted to a total solids concentration between 5 to 20% by the addition of water, preferably filtered water.

Manufacture of Elastomeric Film

The manufacture of the elastomeric film uses conventional equipment. The steps involved can generally be described as follows:

A suitable mould, generally a former in the shape of a glove, may first be dipped into a coagulant tank, which contains calcium ions. The calcium ions are provided in the form of calcium nitrate, or calcium chloride. Also included are wetting and anti-tack agents such as metallic stearates, i.e. zinc or calcium stearates, which can also be added to the coagulant. The concentration of calcium ions is preferably in the range 1.0 to 10.0%, preferably 5 to 10%. The amount of wetness and anti-tack agents are dependent on the amount of wetting and reduction in "tackiness" required, and will vary.

Once the mould is dipped and coated with coagulant, it is dried or partially dried and then dipped into the tank containing the composition of the invention, containing any usual additives. The mould is in the dipping tank for an amount of time to ensure the mould is evenly coated, but not too long to encourage a thicker coating than necessary. Depending on the required thickness of the coating, the dwelling time of the mould in the dipping tank is between 1.0 to 10.0 seconds, preferably 2.0 to 5.0 seconds.

The coating on the mould can then be dried and cured. In the case where a final elastomeric film is made from multiple layers, the first coating layer is substantially dried and the substantially dried composition on the mould is dipped into a second tank containing the composition of the invention which may have a different concentration to that in the first tank. The dwelling time of the mould in the second tank is between 1 and 10 sec, preferably 2 to 5 seconds.

The average thickness of each layer is between 6 and 90% of the final elastomeric film preferably 30 to 70% and more preferably 40 to 65%. The average thickness of each layer is dependent on the number of layers of composition forming the final elastomeric film. The final elastomeric film can consist of 1 to 15 layers, preferably 1 to 10 layers, further preferably 2 to 6 layers.

If a multi layer film is being manufactured, the more layers in the film, the lower the % TSC of the composition forming each layer. This is to keep the thickness of the multilayer film to a minimum. If a single layer film is being manufactured, the % TSC will usually be higher. For example, if there are 6 layers of composition in the synthetic glove, the % TSC of each layer is in the range 5% to 12% TSC. If there are 2-3 layers of composition in the synthetic glove, the % TSC of each layer is in the range 10% to 20% TSC, preferably 13% to 16% TSC.

Further steps can be taken to fine-tune the manufacture of the synthetic glove. The deposited film can be leached to remove extractable components (in heated water ranging from 40 to 60° C. for between 1 to 5 mins). During this leaching process, a substantial amount of surfactant, ionic and any other soluble and extractable components can be removed. The deposited film is then passed through a beading/cuffing chamber.

The film is then dried and cured in a dry oven with a minimum temperature of 90° C., in the range 90-150° C., at a minimum time of 15 minutes, in the range 15-40 mins. Further drying and curing conditions are described in the examples. The film can then be chlorinated before being neutralised, washed, dried, cured and vulcanized in a dry oven between 90-150° C., between 15 and 40 minutes.

Finally, the film is stripped from the mould, providing a synthetic glove.

Elastomeric Film

The final film can be a multiple layer film or a single layer film depending on the method of manufacture. The average thickness of the final film is preferably in the range 0.01-0.3 mm, preferably 0.02-0.2 mm, further preferably 0.03-0.1 mm, even further preferably 0.05-0.10 mm, further preferably 0.03-0.08 mm, more preferably 0.05-0.08 mm.

The film properties of the present invention can be measured according to ASTM D-412. In a preferred embodiment wherein the average thickness of the film is measured at 0.03-0.10 mm, the preferred physical features of the film are as follows: Minimum tensile strength of 14.0 MPa, relatively low in modulus at 300% of less than 3.0 MPa and minimum elongation of 650%.

The desired durability of the film is determined by the end use of the synthetic glove. For example, for non-surgical use, the wearing time is usually below 3 hrs, more practically less than 2 hrs. The durability of the film can be controlled by the curing conditions. Generally, the higher the curing temperature, the more durable the elastomeric film.

The term "average thickness" in respect of the thickness of a glove refers to the average of three thickness measurements, taken at points along the layer of the elastomeric film. The measurements are taken at the cuff, the palm and the finger tip. The method of measuring the glove can be a multi-layer glove, in which the "average thickness" is a reference to the average thickness of the multi-layer film making up the glove.

The term "average thickness" is also used in respect of the thickness of one layer in a multi-layer glove. It is expressed as a percentage of the thickness of the multi-layer glove. For example, the average thickness of one layer of a multi-layer synthetic glove of the present invention, is the average thickness measurement of one layer, measured at the cuff, the palm and the finger tip, expressed as a percentage of the total film thickness (the total thickness also being measured at the cuff, palm and finger tip).

EXAMPLES

The invention will now be described with reference to the following non-limiting examples:

Example 1

The following components were utilised in the preparation of a composition according to the present invention.

TABLE 1

Preparation of composition:

| Ingredient Part per hundred of dry rubber | phr |
| --- | --- |
| Carboxylated Nitrile Butadiene Rubber | 100 |
| Potassium Hydroxide | 1.0 |
| Zinc Oxide | 1.0 |
| Sulfur | 0.1 |
| Wingstal L (the product of p-cresol and dicyclopentadiene) | 0.40 |
| Titanium Dioxide | 1.75 |
| Colorant: | |
| Flexobrite Violet 411/78S | 0.13 |
| Flexobrite Sky Blue 72249 | 0.12 |
| Flexobrite Carmine 11/78 | 0.01 |

TABLE 1-continued

Preparation of composition:

| Ingredient Part per hundred of dry rubber | phr |
|---|---|
| Water | Amount to reach 5-20% TSC |

1.1 The carboxylated polyacryonitrile butadiene nitrile latex was placed into a mixing vessel.
1.2 A solution of a stabilizer comprising potassium hydroxide at 1.0 phr was prepared, and diluted with filtered water. The stabiliser solution was then added to the mixing vessel containing carboxylated polyacryonitrile butadiene nitrile latex.
1.3 The pH of the mixture was adjusted to the level of 8.5-10.5.
1.4 Usual additives such as vulcanizing agent, colourant were added to the mixing vessel. The amounts of these ingredients may vary considerably.
2. Preparation of an Elastomeric Film.
2.1 The composition according to table 1 was stirred continuously for a period of 3 days. This period can vary between 1-5 days, preferably 2-4 days. The speed of stirring was 15 rpm. The speed of stirring can vary between 10-20 rpm.
2.2 The composition was diluted to the concentration required to reach 5-20% total solids content, with filtered water. Examples were prepared at the specific solids content of 13% TSC and 16% TSC.
   The composition was transferred to a dipping tank, the composition having been cooled or heated to a temperature between 25-45° C. The temperature in the first tank is between 35-45° C., preferably between 38-42° C.
2.3 A clean dipping mould was dipped into a coagulant tank consisting of calcium ions which act as a coagulant such as (Calcium Nitrate or Calcium Chloride is utilised to provide the calcium ions). The concentration of the calcium ions is 7-9%. The concentration can vary within the range 1-10%, preferably 5-10%. The mould is then dried at a temperature of more than 150° C.
2.4 The dried mould, coated with coagulant, was then dipped into a tank containing the composition according to table 1. The dwelling time of this first dipping was 3 seconds.
2.5 The first deposited film was dried in a drying chamber, at a temperature of more than 150° C. The average thickness of the first layer was 63% of the finished product.
2.6 The substantially dried film was then dipped into a second latex dipping tank, with a concentration between 13-16% TSC, the same as that in the first tank. The dwelling time was 3 seconds. The thickness of the second layer was 37% (Cuff—43%, Palm—40%, and finger tip—27%).
2.7 The process of steps 2.5 and 2.6 can then be repeated if more dipping is required. This was not conducted for these examples.
2.8 The deposited film consists of two layers which were then leached in hot water, at a temperature of 40-60° C., for 1.0 minute.
2.9 The leached film was then cuffed by passing through a beading/cuffing chamber.
2.10 The cuffed and beaded film was dried and cured in the dry oven with minimum temperature of 90° C., varying between 90-150° C. along the oven length for a minimum of 15 minutes before entering into the chlorination chamber.
2.11 The substantially dried film was then chlorinated on line in a chlorination chamber with the chlorine solution of 800-1000 ppm of free chlorine (l) for about 25 seconds. This can vary between 600-1300 ppm of free chlorine (l) and between 20-60 seconds. The longer the chlorination process, the lower the concentration of chlorine required in the chlorination process.
2.12 The chlorinated and substantially dried film was then neutralized and washed before being sent into another drying chamber. The total time of neutralizing and washing was approximately 35 seconds. This can vary between 20 to 60 seconds.
2.13 The chlorinated, neutralized and washed film was then dried, cured and vulcanized in the dry oven chamber. The curing conditions of this example are provided in table 2 below. The temperature of the oven was between 90 to 150° C.
2.14 The total time of drying, curing and vulcanizing was between 15-40 mins.
2.15 After completing all the treatment of chlorination, neutralizing, drying and curing by way of a continuous conveyer chain system, the film was then stripped from the mould.

The composition of table 1 was then cured under the following conditions.

TABLE 2

Curing conditions

| Film No | Curing Condition Temperature (° C.) | Time (mins) |
|---|---|---|
| 1-1 | <90 | 30 |
| 1-2 | 90-100 | 30 |
| 1-3 | 100-110 | 30 |
| 1-4 | 110-150 | 30 |
| 1-5 | 90-100 | 20 |
| 1-6 | 110-150 | 20 |

TABLE 3

The films in these examples are made from 2 layers.

| Film No | Thickness Average (mm) measured according to ASTM 6319 | Physical Properties | | |
|---|---|---|---|---|
| | | 300% modulus (MPa) | Ultimate Elongation % | Tensile Strength (MPa) |
| 1-1 | 0.083 | 1.3-2.2 | 600-800 | 18-21 |
| 1-2 | 0.075 | 1.7-2.0 | 650-800 | 14-25 |
| 1-3 | 0.073 | 1.8-2.6 | 700-800 | 14-30 |
| 1-4 | 0.083 | 2.5-3.0 | 650-750 | 18-30 |
| 1-5 | 0.093 | 1.6-2.1 | 650-800 | 14-21 |
| 1-6 | 0.083 | 1.9-2.4 | 700-800 | 16-28 |

The above films are generated from smooth/non-textured surface moulds. When the moulds utilised are rough, the average thickness measurements can be approximately 10-25% greater than the measurement given above. For example, for a smooth/non-textured mould providing a film with an average thickness of 0.07 mm, a rough/textured mould will provide a film with an average thickness of 0.08 mm.

The above results clearly show that all the above films meet the ASTM D-412 requirements.

TABLE 4

Wearing test

| Film No | Durability (hrs) |
|---|---|
| 1-1 | Less than 1.0 hr |
| 1-2 | Less than 2.0 hrs |
| 1-3 | 2.0-4.0 hrs |
| 1-4 | More than 4.0 hrs |
| 1-5 | Less than 2.0 hrs |
| 1-6 | Between 2.0-4.0 hrs |

As clearly shown from the above table, higher temperature is still required in order to obtain good durability, even though the film is relatively high in tensile strength. Examples of films 1-1, 1-2 and 1-5 which were cured at lower temperatures show lower durability.

Example 2

The method of example 1 was repeated for the following formulation, in which an accelerator ZDBC, zinc dibutyl dithiocarbamate was included.

TABLE 6

| Ingredient Part per hundred of dry rubber | (phr) |
|---|---|
| Carboxylated Nitrile Butadiene Rubber | 100 |
| Potassium Hydroxide | 1.0-1.5 |
| Agent, Zinc Oxide | 0.5-1.0 |
| Sulfur | 0.5-1.0 |
| ZDBC | 0.2-0.6 |
| Antioxidant | 0.1-0.3 |
| Titanium Dioxide | 1.5-2.0 |
| Colorant—Blue | 0.2-0.3 |

The curing conditions are as follows:

TABLE 7

| | Curing Condition | |
|---|---|---|
| Film No | Temperature (° C.) | Time (mins) |
| 1-1 | <90 | 30 |
| 1-2 | 90-100 | 30 |
| 1-3 | 100-110 | 30 |
| 1-4 | 110-150 | 30 |
| 1-5 | 90-100 | 20 |
| 1-6 | 110-150 | 20 |

The results showing the physical properties of the elastomeric film are provided below:

TABLE 8 the films in this example are made from 2 layers.

| Film No | Thickness Averages (mm) measured according to ASTM 6319 | 300% Modulus (MPa) | Ultimate Elongation % | Tensile Strength (Mpa) |
|---|---|---|---|---|
| 1-1 | 0.073 | 1.2-2.0 | 650-800 | 15-22 |
| 1-2 | 0.083 | 1.5-2.2 | 670-800 | 17-25 |
| 1-3 | 0.073 | 1.7-2.6 | 700-800 | 16-30 |
| 1-4 | 0.073 | 2.0-2.7 | 650-780 | 18-30 |
| 1-5 | 0.083 | 1.2-1.8 | 650-800 | 14-20 |
| 1-6 | 0.073 | 1.7-2.4 | 700-800 | 16-30 |

The durability test results are shown below in table 9. The tests were conducted at a temperature between 22-37° C. and humidity of 37-99%.

TABLE 9

| Film No | Durability (hrs) |
|---|---|
| 1-1 | Less than 1.0 hr |
| 1-2 | Less than 2.0 hrs |
| 1-3 | Between 2.0-4.0 hrs |
| 1-4 | More than 4.0 hrs |
| 1-5 | Less than 2.0 hrs |
| 1-6 | Between 2.0-4.0 hrs |

The above results indicate the time from which the gloves are worn to the point when defects began to appear. From the above table we can conclude that the durability of the film cured at a lower temperature results in a lower durability. The gloves cured at a higher temperature are more durable.

1. Modified Draize—95' Test.

Objective

To evaluate whether residual chemical additives at the level that may induce Type IV allergy in the unsensitized general user population are present in a finished synthetic rubber glove. The glove utilised in the test is made from the composition of example 1. The physical properties of the glove of this example are as follows:

| | Dimension (mm) | | | | | |
|---|---|---|---|---|---|---|
| | | | Thickness | | | |
| Sample Reference | Length | Width | Finger | Palm | Cuff | Average |
| Mean | 246 | 96 | 0.11 | 0.09 | 0.08 | 0.09 |

| | Tensile Properties Unaged | | |
|---|---|---|---|
| Sample Reference | Tensile Strength (MPa) | Elongation at Break, % | Modulus at 300% (MPa) |
| Mean | 17.08 | 781.84 | 2.02 |

| | Tensile Properties Aged | | |
|---|---|---|---|
| Sample Reference | Tensile Strength (MPa) | Elongation at Break, % | Modulus at 300% (MPa) |
| Mean | 17.36 | 753.43 | 1.95 |

Study Procedure

The study was conducted in two stages. In the first stage, a population of 50 human subjects was tested to evaluate product for the potential to cause irritation or sensitization. The second stage was initiated on a further 150 individuals after the first stage has shown that the test product does not indicate a potential for inducing dermal irritation and does not show sensitization capability.

Induction Phase—A sample of the test article, minimum size 2 cm×2 cm, was applied with the inner surface in contact with the skin to each test subject in the study. The test patch was patched on to the upper back area and continuously secured on the edges with a nonreactive adhesive tape whilst ensuring the complete occlusion of the patch.

The induction phase of the test includes application of ten patches of the test article on each Monday, Wednesday, and Friday. The test article was removed and replaced by a new one at the same site every 48 hours for a total of ten changes. The patches applied on Fridays were removed on Mondays.

Rest Period

At the end of the three weeks induction period, the test article was removed and no further test articles were applied to the test subjects for the following three weeks, until the challenge patches were applied.

Challenge Phase

Two samples of the same test article, a minimum 2 cm×2 cm in size was applied consecutively to a virgin site for 48 hours each. The test site was evaluated for reaction at the time of each patch removal and again two to four days after removal of the second patch.

Test Subject Selection/Study Population

The test was completed on a minimum of 200 nonsensitized adult human subjects. This sample size, with all negative results, provides 95% confidence that the chemical sensitization potential of the synthetic rubber glove (NBR) in the user population is expected to be less than 1.5%.

Results

Two hundred subjects completed the two stages of the study. One hundred and sixty one subjects were Asiatics (80.5%), thirty-five subjects were Caucasian (17.5%) and four subjects were Afro Caribbean (2%). Agen range of the study subjects were between eighteen to fifty two years (mean 26.49±7.4 years). One hundred and sixteen subjects were brown coloured skin, skin type IV (58%), forty-five subjects were fair coloured skin, skin type III (22.5%), thirty-five were white coloured skin, skin type I (17.5%) and four subjects were black coloured skin, skin type VI, (2%). One hundred and two subjects were female (51%) and ninety-eight subjects were male (49%).

All of these 200 subjects had a final score of not more than 1.5 during the induction phase and the challenge phase. (See table 2 and 3 below)

PP: prior to patch

Scoring Criteria

Patch Testing Diagnostic criteria

TABLE 1

Scoring Criteria—The intensity of reactions were scored according to the following criteria:

| Basic Score: | Description: |
|---|---|
| 0 | No visible reaction |
| 0.5 | Doubtful or negligible erythema reaction |

TABLE 1-continued

Scoring Criteria—The intensity of reactions were scored according to the following criteria:

| | |
|---|---|
| 1.0 | Mild or just perceptible macular erythema reaction in a speckled/follicular, patchy or confluent pattern (slightly pink) |
| 2.0 | Moderate erythema reaction in a confluent pattern (definite redness) |
| 3.0 | Strong or brisk erythema reaction that may spread beyond the test site |

| Supplemental Scores: | Description: | Label: |
|---|---|---|
| 0.5 | Edema | E |
| 0.5 | Papules | P |
| 0.5 | Vesicles | V |
| 0.5 | Bullae | B |

Interpretation of Results

This study that was completed on 200 nonsensitized adult human subjects giving all negative hence provides 95% confidence that the chemical sensitization potential of the synthetic rubber glove (NBR) in the user population is expected to be less than 1.5%.

Conclusions

There is no clinical evidence of the presence of residual chemical additives at the level that may induce Type IV allergy in the unsensitized general user population in the tested rubber glove.

Skin sensitization test ('Modified Draize-95' Test) of this medical device, rubber glove tested on 200 non sensitized human subjects is negative, hence meeting the requirements for the claim: This product demonstrated reduced potential for sensitizing users to chemical additives as described in Guidance for Medical Gloves: A Workshop Manual, (FDA 96-4257).

2. Patch Test on Sensitized Individuals

Objective

To determine whether a finished synthetic rubber glove contains residual chemicals which might cause a skin reaction in individuals who are already allergic to one or more of the following classes of chemicals: thiazoles, thiurams and carbamates. The glove utilised in the tests is the same as that used in the Modified Draize test.

Study Procedure:

A minimum 2 cm×2 cm sample of the test article was applied to each of the 25 human subjects who were previously diagnosed to be allergic to one or more of the three classes of known chemical sensitizer(s) in NR containing medical devices; thiurams, carbamates and thiazoles. The inside of the rubber glove was tested on the human skin. In this test procedure the patch was applied with all edges continuously secured and complete occlusion was ensured with non-reac-

TABLE 2

Final Score of the skin reaction induced by the test patches on the skin during induction and Challenge phase

| | Induction Phase | | | | | | | | | | | Challenge Phase | | | |
|---|---|---|---|---|---|---|---|---|---|---|---|---|---|---|---|
| Final Score | | | | | | | Day | | | | | | | | |
| | 1(PP) | 3 | 5 | 8 | 10 | 12 | 15 | 17 | 19 | 22 | 24 | 1(PP) | 3 | 5 | 8 |
| 0 | 200 | 181 | 180 | 179 | 176 | 182 | 171 | 174 | 181 | 182 | 185 | 200 | 185 | 183 | 196 |
| 0.5 | 0 | 18 | 18 | 21 | 21 | 17 | 24 | 25 | 18 | 18 | 10 | 0 | 12 | 17 | 4 |
| 1 | 0 | 1 | 2 | 0 | 3 | 1 | 5 | 1 | 1 | 0 | 5 | 0 | 3 | 0 | 0 |
| 1.5 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | tive adhesive tape for 48 hours. The test sites were evaluated at the time of the patch removal and again two to four days later.

Test Subject Selection/Study Population

The test subjects with a prediagnosed allergy of a minimum grade of 1.5; (to rubber chemicals, thiurams, carbamates and thiazoles) according to the standard scoring of the North American Contact Dermatitis Research Group (NACDRG) ("Am. J. Contact Dermatitis" 2:122-129, 1991) was selected for this study.

Results

Twenty five test subjects with a prediagnosed allergy to either thiuram, carbamates and thiazoles completed this study.

These subjects were already sensitized to a minimum of one or all three of the above rubber chemicals and the range of sensitivity level score to these rubber chemicals were between 1.5 to 4.0. During the closed patch test procedure, the final score at each visit of each prediagnosed allergic subjects to the test sample was zero, hence negative patch test results.

| | Allergic score (final score) for patch test | | | | | | |
|---|---|---|---|---|---|---|---|
| Subject Reference Number | Day 1 Prior to patch application | Day 3 Upon patch removal | Day 5 48 hrs post patch removal | Sensitivity Level Score of Subjects With Prediagnosed Allergy To Known Chemical Sensitizer(s) Rubber Chemical (Chemical Sensitizer(s)) | Basic | Supp | Total |
| 1 | 0 | 0 | 0 | 1. Mercaptobensothiazole | 1 | 0.5(P) | 1.5 |
| 2 | 0 | 0 | 0 | 1. Mercapto Mix | 1 | 0.5(P) | 1.5 |
| | | | | 2. Dibenzothiazyl Disulphide | 1 | 0.5(P) | 1.5 |
| | | | | 3. Morpholinylmercaptobenzothiazole | 1 | 0.5(P) | 1.5 |
| | | | | 4. Bis(diethyldithiocarbamato zinc 1% | 1 | 0.5(P) | 1.5 |
| 3 | 0 | 0 | 0 | 1. Mercaptobensothiazole | 1 | 0.5(P) | 1.5 |
| 4 | 0 | 0 | 0 | 1. Thiuram Mix | 1 | 0.5(P) | 1.5 |
| | | | | 2. Dipentamethylenethiuram Disulphide | 1 | 0.5(P) | 1.5 |
| | | | | 3. Tetramethylthiuram Disulphide | 0.5 | 0.5(P) | 1 |
| | | | | 4. Mercapto Mix | 1 | 0.5(P) | 1.5 |
| | | | | 5. Dibenzothiazyl Disulphide | 0.5 | 0.5(P) | 1 |
| | | | | 6. N-Cyclohexylbenzothiazyl Sulphenamide | 1 | 0.5(P) | 1.5 |
| | | | | 7. Morpholinylmercaptobenzothiazole | 1 | 0.5(P) | 1.5 |
| | | | | 8. Mercaptobenzothiazole | 1 | 0.5(P) | 1.5 |
| 5 | 0 | 0 | 0 | 1. Thiuram Mix | 1 | 0.5(P) | 1.5 |
| 6 | 0 | 0 | 0 | 1. Dipentamethylenethiuram Disulphide | 1 | 0.5(P) | 1.5 |
| | | | | 2. Tetramethylthiuram Monosulphide | 1 | 0.5(P) | 1.5 |
| | | | | 3. Mercaptobenzothiazole | 2 | 0.5(P) | 2.5 |
| 7 | 0 | 0 | 0 | 1. Thiuram Mix | 1 | 0.5(P) | 1.5 |
| 8 | 0 | 0 | 0 | 1. Thiuram Mix | 3 | 0.5(E) | 3.5 |
| | | | | 2. Tetramethylthiuram Monosulphide | 3 | 0.5(E) | 3.5 |
| | | | | 3. Tetramethylthiuram Disulphide | 3 | 0.5(E) | 3.5 |
| 9 | 0 | 0 | 0 | 1. Bis(dibuthyldithiocarbamato)zinc 1% | 1 | 0.5(E) | 1.5 |
| 10 | 0 | 0 | 0 | 1. Bis(diethyldithiocarbamato)zinc 1% | 1 | 0.5(E) | 1.5 |
| 11 | 0 | 0 | 0 | 1. Bis(diethyldithiocarbamato)zinc 1% | 2 | 0.5(P) | 2.5 |
| | | | | 2. Bis(dibuthyldithiocarbamato)zinc 1% | 2 | 0.5(P) | 2.5 |
| 12 | 0 | 0 | 0 | 1. Mercaptobenzothiazole | 2 | 0.5(P) | 2.5 |
| 13 | 0 | 0 | 0 | 1. Thiuram Mix | 1 | 0.5(P) | 1.5 |
| 14 | 0 | 0 | 0 | 1. Mercapto Mix | 1 | 0.5(P) | 1.5 |
| | | | | 2. Mercaptobenzothiazole | 1 | 0.5(P) | 1.5 |
| 15 | 0 | 0 | 0 | 1. Bis(diethyldithiocarbamato)zinc 1% | 2 | 0.5(P) | 2.5 |
| 16 | 0 | 0 | 0 | 1. Thiuram Mix | 3 | 1(EV) | 4.0 |
| | | | | 2. Dipentamethylenethiuram Disulphid | 3 | 1(EV) | 4.0 |
| | | | | 3. Tetraethylthiuram Disulphide | 3 | 1(EV) | 4.0 |
| | | | | 4. Tetramethylthiuram Disulphide | 3 | 1(EV) | 4.0 |
| | | | | 5. Mercapto Mix | 3 | 1(EP) | 4.0 |
| | | | | 6. Dibenzothiazyl Disulphide | 3 | 1(EV) | 4.0 |
| | | | | 7. N-Cyclohexylbenzothiazyl Sulphenamide | 3 | 1(EP) | 4.0 |
| | | | | 8. Morpholinylmercaptobenzothiazole | 3 | 1(EP) | 4.0 |
| | | | | 9. Mercaptobenzothiazole | 3 | 1(EP) | 4.0 |
| | | | | 10. Bis(diethyldithiocarbamato)zinc 1% | 3 | 1(EP) | 4.0 |
| 17 | 0 | 0 | 0 | 1. Mercapto Mix | 1 | 0.5(P) | 1.5 |
| | | | | 2. Mercaptobenzothiazole | 1 | 0.5(P) | 1.5 |
| 18 | 0 | 0 | 0 | 1. Thiuram Mix | 3 | 1(PE) | 4.0 |
| | | | | 2. Tetramethylthiuram Monosulphide | 3 | 1(PE) | 4.0 |
| | | | | 3. Tetramethylthiuram Diosulphide | 3 | 1(PE) | 4.0 |
| 19 | 0 | 0 | 0 | 1. Mercapto Mix | 2 | 0.5(P) | 2.5 |
| | | | | 2. Dibensothiazyl Disulphide | 1 | 0.5(P) | 1.5 |
| | | | | 3. N-Cyclohexylbenzothiazyl Sulphenamide | 1 | 0.5(P) | 1.5 |
| | | | | 4. Morpholinylmercaptobenzothiazole | 1 | 0.5(P) | 1.5 |
| 20 | 0 | 0 | 0 | 1. Bis(diethyldithiocarbamato)zinc 1% | 2 | 0.5(E) | 2.5 |

-continued

| | Allergic score (final score) for patch test | | | | | | |
|---|---|---|---|---|---|---|---|
| Subject Reference Number | Day 1 Prior to patch application | Day 3 Upon patch removal | Day 5 48 hrs post patch removal | Sensitivity Level Score of Subjects With Prediagnosed Allergy To Known Chemical Sensitizer(s) Rubber Chemical (Chemical Sensitizer(s)) | Basic | Supp | Total |
| 21 | 0 | 0 | 0 | 1. Thiuram Mix | 1 | 0.5(P) | 1.5 |
| | | | | 2. Dipentamethylenethiuram Disulphid | 1 | 0.5(P) | 1.5 |
| | | | | 3. Tetramethylthiuram Disulphide | 1 | 0.5(P) | 1.5 |
| | | | | 4. Mercaptobenzothiazole | 1 | 0.5(P) | 1.5 |
| 22 | 0 | 0 | 0 | 1. Bis(diethyldithiocarbamato)zinc 1% | 2 | 0.5(P) | 2.5 |
| 23 | 0 | 0 | 0 | 1. Bis(diethyldithiocarbamato)zinc 1% | 2 | 0.5(E) | 2.5 |
| 24 | 0 | 0 | 0 | 1. Thiuram Mix | 2 | 0.5(P) | 2.5 |
| 25 | 0 | 0 | 0 | 1. Mercapto Mix | 2 | 0.5(P) | 2.5 |
| | | | | 2. Bis(diethyldithiocarbamato)zinc 1% | 2 | 0.5(P) | 2.5 |

Scoring Criteria

Patch Testing Diagnostic criteria

Scoring Criteria—The intensity of reactions will be scored according to the following criteria:

| Basic Score: | Description: | |
|---|---|---|
| 0 | No visible reaction | |
| 0.5 | Doubtful or negligible erythema reaction | |
| 1.0 | Mild or just perceptible macular erythema reaction in a speckled/follicular, patchy or confluent pattern (slightly pinking) | |
| 2.0 | Moderate erythema reaction in a confluent pattern (definite redness) | |
| 3.0 | Strong or brisk erythema reaction that may spread beyond the test site | |
| Supplemental Scores: | Description: | Label: |
| 0.5 | Edema | E |
| 0.5 | Papules | P |
| 0.5 | Vesicles | V |
| 0.5 | Bullae | B |

The supplemental scores were added to the basic score, if the reactions include described cutaneous reaction. The final score is the sum of basic and supplemental score values.

Interpretation of Results

The study that was completed on 25 individuals who were positively diagnosed to be allergic to one or more of the chemical sensitizers, thiuram, carbarmates or thiazoles in the synthetic rubber glove. This sample size, with all negative results, provides 95% confidence that chemicals on the tested synthetic rubber medical products, thiuram, carbamates and/or thiazoles would be expected to cause reactions in less than 11.3% of sensitized individuals.

Conclusions

There was no clinical evidence that the tested synthetic rubber gloves contains residual chemicals which might cause a skin reaction in individuals who are already allergic to rubber chemicals: thiazoles, thiurams and carbamates. All twenty five tested individuals in this group present negative results (a score of less than 1.0 based on the scoring criteria as described) thus meeting the prerequisite for the claim of reduced reaction-inducing potential.

It will be understood to persons skilled in the art of the invention that many modifications may be made without departing from the scope of the invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A multiple-coating method of manufacturing a layered elastomeric film comprising the steps of:
   (i) dipping a mould into a coagulant containing calcium ions at a concentration of between 1% and 10% by weight, followed by
   (ii) drying or partially drying the coagulant-dipped mould,
   (iii) dipping the coagulant-coated mould into a composition for producing an elastomeric film having a total solids content of between 5% and 20% and a temperature of between 25° C. and 45° C. for a dwell time of between 1.0 and 10.0 seconds to produce a layer of elastomeric film composition on the mould,
   (iv) drying the elastomeric film composition,
   (v) dipping the mould into a composition for producing an elastomeric film having a total solids content of between 5% and 20% and a temperature of between 25° C. and 45° C. for a dwell time of between 1.0 and 10.0 seconds to produce a further layer of elastomeric film composition on the mould, directly on the preceding elastomeric film layer;
   (vi) optionally repeating the drying step (iv) and the further dipping step (v), and
   (vii) drying and curing the layered elastomeric film, wherein the average thickness of each layer is between 6% and 90% of the average thickness of the total layered elastomeric film, and the average thickness of the total layered elastomeric film is between about 0.01 mm and about 0.3 mm.

2. The method according to claim 1, wherein the composition for producing an elastomeric film comprises a synthetic elastomeric polymer or copolymer.

3. The method according to claim 2, wherein the composition for producing an elastomeric film comprises a polymer containing free ionically cross-linkable groups and covalently cross-linkable groups.

4. The method according to claim 3, wherein the composition for producing an elastomeric film further comprises a metal oxide cross-linking agent.

5. The method according to claim 4, wherein the composition further comprises sulphur and/or one or more accelerators.

6. The method according to claim 1, wherein the drying step (iv) and the further dipping step (v) are repeated at least once.

7. The method according to claim 1, wherein the film has between 2 to 15 layers.

8. The method according to claim 7, wherein the film has between 2 to 6 layers.

9. The method according to claim 8, wherein the film has two or three layers.

10. The method according to claim 9, wherein the average thickness of each layer is between 30-70% of the average thickness of the total layered elastomeric film.

11. The method of claim 1, wherein the mould is a hand-shaped mould, and the layered elastomeric film is in the shape of a glove.

12. The layered elastomeric film produced by the method of claim 1.

* * * * *